United States Patent [19]

Chung

[11] 4,351,451
[45] Sep. 28, 1982

[54] RUBBER SEALED METAL VACUUM BOTTLE AND STOPPER CAPS THEREFOR

[75] Inventor: Ha D. Chung, Seoul, Rep. of Korea

[73] Assignee: Han Baek Trading Co., Ltd., Seoul, Rep. of Korea

[21] Appl. No.: 91,866

[22] Filed: Nov. 6, 1979

[30] Foreign Application Priority Data

Feb. 17, 1979 [KR] Rep. of Korea ............... 890/1979[U]
Feb. 17, 1979 [KR] Rep. of Korea ............... 891/1979[U]

[51] Int. Cl.³ .................. A47J 41/02; B65D 25/14; B65D 25/18
[52] U.S. Cl. ................... 220/420; 215/13 R; 220/288
[58] Field of Search ............ 220/288, 430, 304, 458, 220/295, 420, 421, 455, 456; 215/356, 364, 13 R; 217/107, 109

[56] References Cited

U.S. PATENT DOCUMENTS 1,423,463  7/1922  Shaw .............................. 215/356 X
3,115,981 12/1963  Darmstadt et al. ............. 215/364 X
4,121,730 10/1978  Dammer ........................ 215/356 X Primary Examiner—George T. Hall
Attorney, Agent, or Firm—Hammond & Littell, Weissenberger and Muserlian

[57] ABSTRACT

The invention is directed to a rubber sealed metal vacuum bottle comprising an inner shell and an outer shell; a U-shaped, circular rubber seal positioned between the throat portion of the inner shell and the upper end portion of the outer shell, said rubber seal having a U-shaped, circular metal reinforcing plate fitting therein, which reinforcing plate has two or more evenly spaced holes therethrough; and a circular supporting member fixed vertically between two inclined portions of the bottoms of the inner and outer shells. The invention is also directed to stopper caps for a metal vacuum bottle.

2 Claims, 7 Drawing Figures

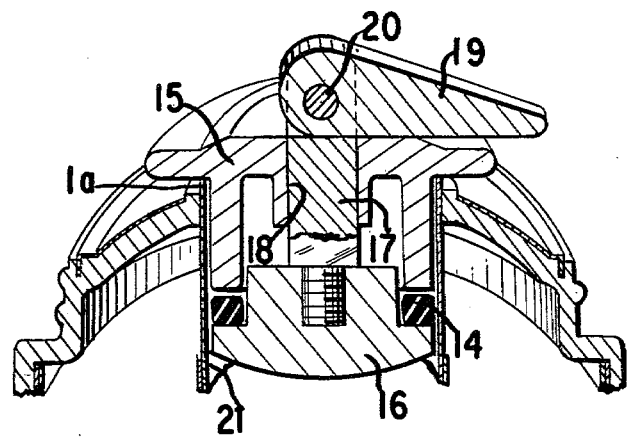
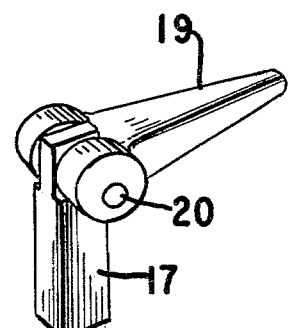
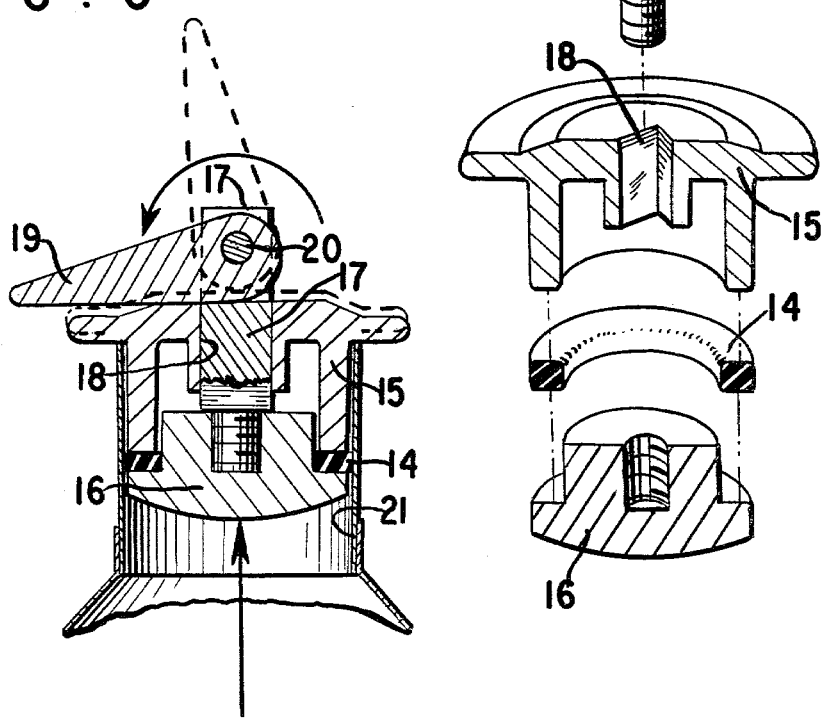
FIG. 4
FIG. 6
FIG. 5

4,351,451

RUBBER SEALED METAL VACUUM BOTTLE AND STOPPER CAPS THEREFOR

FIELD OF THE INVENTION

The present invention relates to an improved vacuum bottle and stopper caps therefore. More particularly, the invention relates to a rubber sealed metal vacuum bottle having circular rubber pieces separating the inner and outer shells and stopper caps fitting therein.

BACKGROUND OF THE INVENTION

Metal vacuum bottles comprising an inner shell, an outer shell, and a cup-shaped member mounted on the bottom portion of the outer shell to cover and protect a soldering portion of a capillary tube on the bottom portion of the outer shell are known in the prior art. The bottle has a contact welded surface between the upper end portion in the outer shell and the throat portion of the inner shell to form a space between the outer shell and the inner shell. To make the space between the shells a vacuum, air in the space is removed by conventional means, such as a vacuum pump, through a capillary tube, which is attached on the middle part of the bottom in the outer shell.

Accordingly, since the contact welded surface between the shells is typically made of a metal such as stainless steel, this surface acts as a heat transfer surface in a conventional vacuum bottle and the temperatures of contents such as boiling water, are not maintained. For example, thermal conductivity of synthetic rubber is 0.11 Kcal/m.hr.°C. and that of stainless steel is 24.5 Kcal/m.hr.°C. Thus, stainless steel conducts 223 times more heat than synthetic rubber for a given time period.

In addition, the forming and production of metal, particularly stainless steel, parts is more complicated and expensive than for rubber parts.

Stopper caps for vacuum bottles are also known in the art. In one commonly employed stopper cap, the stopper cap is provided with a thread screw that fits cooperatingly with a thread screw on the interior of the bottle throat and a rubber ring. This system is based on the principle that liquid in the bottle can be contained by threading the stopper cap into the bottle throat and sealing the connection with the rubber ring. However, with use the ring may deform or actually be separated, so as to cause an imperfect seal. Accordingly, a perfect seal is difficult, and the temperature of the contents will not be maintained.

BRIEF DESCRIPTION OF THE DRAWINGS

FIG. 4 represents a cross-sectional view of a cam-type stopper cap in an unsealed position.

FIG. 5 represents a cross-sectional view of a cam-type stopper cap in a sealed position.

FIG. 6 represents an enlarged and broken, cross-sectional view of the cam-type stopper cap.

OBJECTS OF THE INVENTION

Figure 2:
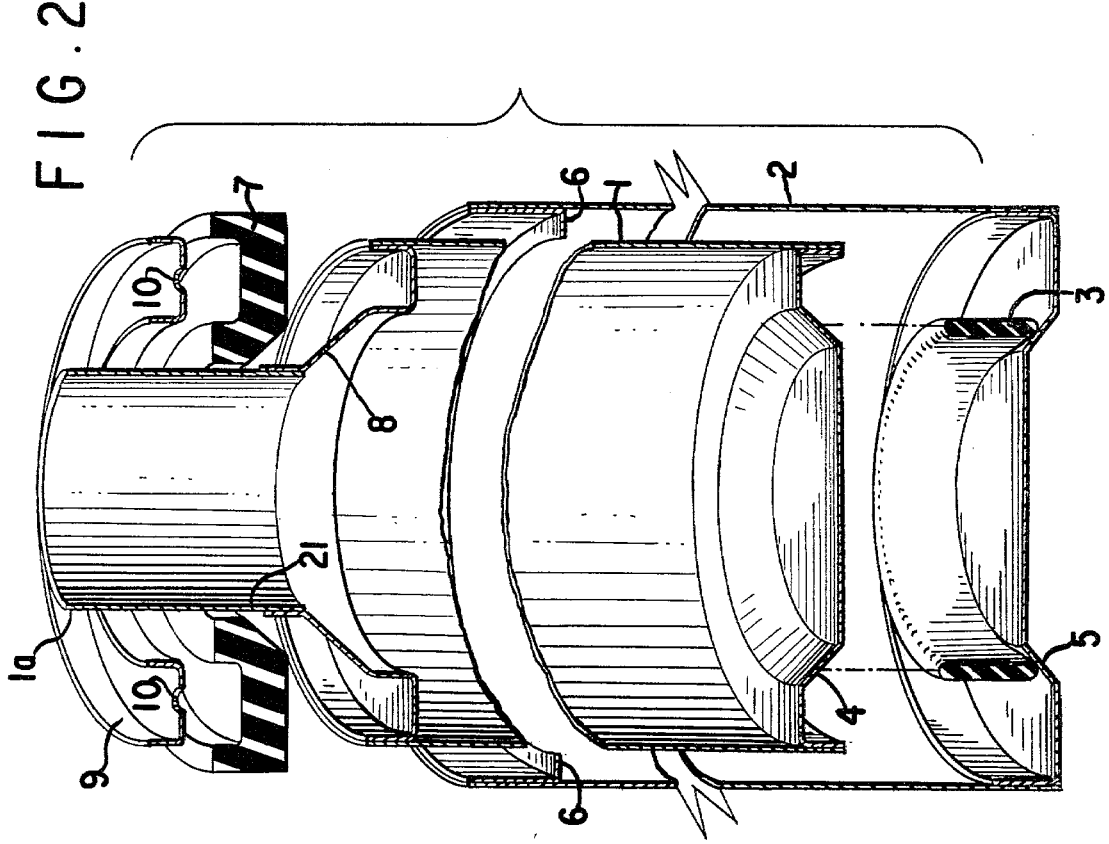
FIGS. 2 and 3 represent detailed, enlarged and broken, cross-sectional views of the vacuum bottle of FIG. 1.

It is an object of the invention to provide an improved, rubber sealed metal vacuum bottle.

It is also an object of the invention to provide improved stopper caps for a vacuum bottle.

It is further an object of the invention to provide a vacuum bottle system capable of maintaining the temperature of the bottle contents for longer periods of time.

These and other objects of the invention will become more apparent in the discussion below.

DETAILED DESCRIPTION OF THE INVENTION

This invention is directed to a rubber sealed metal vacuum bottle that can be used to keep the temperature of materials, such as boiling water, for a long time without direct connection of contact surfaces of outer and inner shells. The rubber sealed metal vacuum bottle comprises a thermally insulating circular rubber seal, a U-shaped circular metal plate thereon on the throat of bottle, and two cup-shaped members or supports on the middle part of the bottom portion in the outer shell. A contact surface of the outer and inner shell is not formed in the throat part, so that heat transfer between the two shells by conduction can be minimized.

One embodiment of the present invention consists of the circular rubber seal being positioned horizontally between the upper end part of outer shell and the throat part of inner shell, and the U-shaped circular reinforcing metal plate being attached to the surface of the rubber seal. Also, a circular supporting member is positioned between bottom parts of the inner and outer shells.

Due to the configurations of the rubber seal, the metal plate, and the supporting member between the inner and outer shells, heat transfer by the indirect connection of inner and outer shell is reduced and the temperature of materials in the inner shell can be kept or maintained for a long time.

In general, heat is transferred by conduction, convection, and radiation, conduction being the main factor to be considered in the metal vacuum bottle. Blocking those three ways of heat transfer constitutes the thermal insulation which keeps the temperature of materials unchanged.

Convection is reduced by forming a vacuum between the inner and outer shells, and radiation is reduced by using a reflecting material on the surface of inner shell. However, transfer by conduction remains as a most important problem. Such transfer depends upon the thermal conductivity of the connecting materials between two shells, for there is no practical method of suspending the inner shell without a mechanical connection through which some heat will be transferred.

In practice, the rubber seal will have a cross section approximately 20 times bigger than that of a comparable metal contact welded surface but will be about 11 times more effective in reducing heat transfer by conduction.

Another advantage of rubber sealing concerns reduced production costs. The rubber sealing can be repaired easily, e.g., replaced, when a defect is noticed during even a final inspection; however, a defect in the contact welded device of the prior art cannot be so easily remedied.

The present invention also relates to a new and improved stopper cap for a metal vacuum bottle comprising an eccentric cam lever, pulling stud, bottom-pressing member, and rubber O-ring member. The stopper cap prevents materials contained in the interior of the vacuum bottle from leaking and aids in maintaining the temperature. More specifically, the stopper cap has an eccentric cam lever which is connected to a pulling stud, which stud is threaded into the middle of the bottom-pressing member. The rubber O-ring member is positioned in the space between the stopper cap body and the bottom-pressing member.

The rubber O-ring member should be flexible. Then, due to the flexibility of the O-ring member, the stopper cap is able to block the heat transfer between interior and exterior space and to prevent materials, such as boiling water, from leaking during transportation. The stopper cap body is made of lower heat conducting materials, such as ABS plastics, to minimize thermal conductibility.

The primary advantages of stopper caps operating by the eccentric cam lever are perfect sealing performance and quick accessability as compared to the performance of typical screw stoppers.

This invention is further directed to an improved stopper cap comprising a stopper cap body, an O-ring retainer, and an O-ring. The stopper cap is threaded into the mouth of a vacuum bottle in such a manner that the O-ring is compressed against the sides of the opening to seal against leakage and heat transfer.

Figure 1:
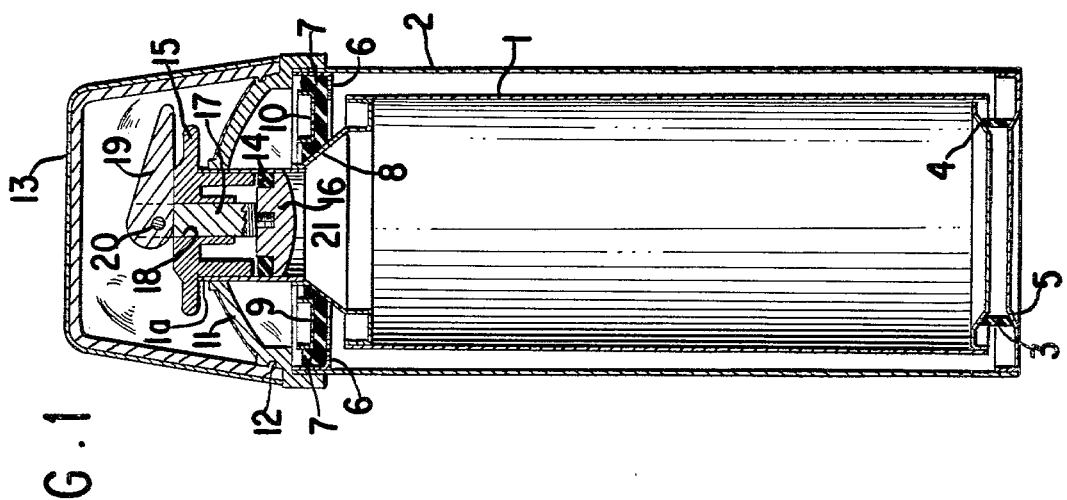
FIG. 1 represents a cross-sectional view of a rubber sealed metal vacuum bottle and stopper cap according to the invention.
Figure 3:
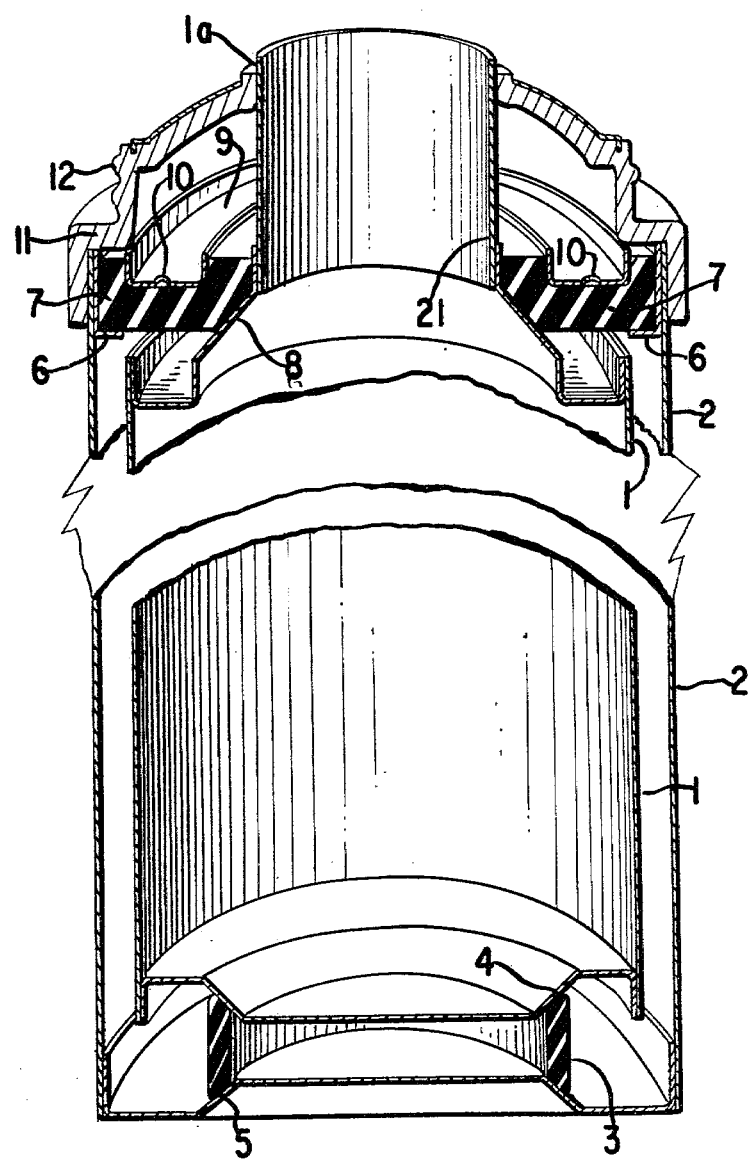

As can be seen in FIGS. 1, 2, and 3, an inner shell 1 is located inside outer shell 2, and a circular supporting member 3 is positioned between the bottom portions of shells 1 and 2. The bottom portions of shells 1 and 2 have inclined configurations 4 and 5, respectively, which act to hold or position member 3 so that it is perpendicuar to the concentric axis of the vacuum bottle.

A rim 6 is welded on the inside of the upper end of outer shell 2. This rim 6 is inwardly flanged so as to become the seat of rubber seal 7. The rubber seal 7 is snuggly fitted into the space between shells 1 and 2, the inner edge of seal 7 being on the upper shoulder 8 of inner shell 1 and the outer edge of seal 7 being on rim 6.

To avoid minor leakage between the rubber and metal surfaces, some bonding materials may be applied to the surface of rubber seal 7 before the rubber seal 7 is press fitted into place.

A U-shaped circular reinforcing metal, preferably steel, plate 9, with four small holes of the same size 10 around the intermediate circle of the plate 9, is securely attached or bonded to the rubber seal 7 to prevent the rubber seal 7 from deflecting downward when air in the space between two shells is pumped out. Air can be pumped out by using a conventional mechanical syringe put through a hole 10 of the metal plate 9 and through the rubber seal 7 underneath. After the air is pumped out and a vacuum exists in the space between the shells 1 and 2, the hole in the rubber seal 7 can be filled with bonding materials by the vacuum "suction" power. A plastic protector 11, to which a hand grip can be readily attached, is press fitted from the top to protect rubber seal 7 and to improve the design and to provide a screw thread 12 upon which to fit a cup 13.

The throat 1a of inner shell 1 is extended outwardly slightly more than the protector 11. The center part of rim 6 is so shaped and positioned to fit with the protector 11, to prevent the rim from scratching, and to improve the design.

The eccentric cam lever stopper cap of this invention can be seen in FIGS. 1, 4, 5, and 6. A rubber O-ring member 14 is positioned in the gap between fitting a stopper cap body 15 and bottom-pressing member 16. Member 16 is connected to pulling stud 17, which extends outwardly through a hole 18 at the center of stopper cap body 15. Preferably stud 17 is threaded into member 16. Eccentric cam lever 19 is connected to pulling stud 17 by pin 20.

When the cam lever 19 is positioned downwardly, as in FIG. 4, the space between fitting or stopper cap body 15 and bottom-pressing member 16 is sufficient to hold the rubber O-ring 14 in the non-compressed diameter. Accordingly, when the cam lever 19 is shifted with an angle of 180° downwardly as in FIG. 5 (as the direction of an arrow), the pin 20 goes up as much as the amount of the eccentricity of the cam lever 19, thus pulling stud 17 upwardly.

Pulling of the stud 17 upwardly reduces the gap between the fitting or stopper cap body 15 and bottom-pressing member 16 and compresses and squeezes the rubber O-ring 14. Compressed rubber O-ring 14 fills all the adjacent space with squeezed rubber to tightly seal in 360° fashion, the opening 21. Squeezed rubber ring 14 then acts to prevent leakage and heat transfer. Returning cam lever 19 to its former position by shifting the lever 180° lower pulling stud 17, causes the pressure on O-ring 14 to be released, and permits removal of the stopper cap from the bottle. The stopper cap can be easily removed merely by gripping stopper cap body 15 and pulling outwardly from the bottle.

Figure 7:
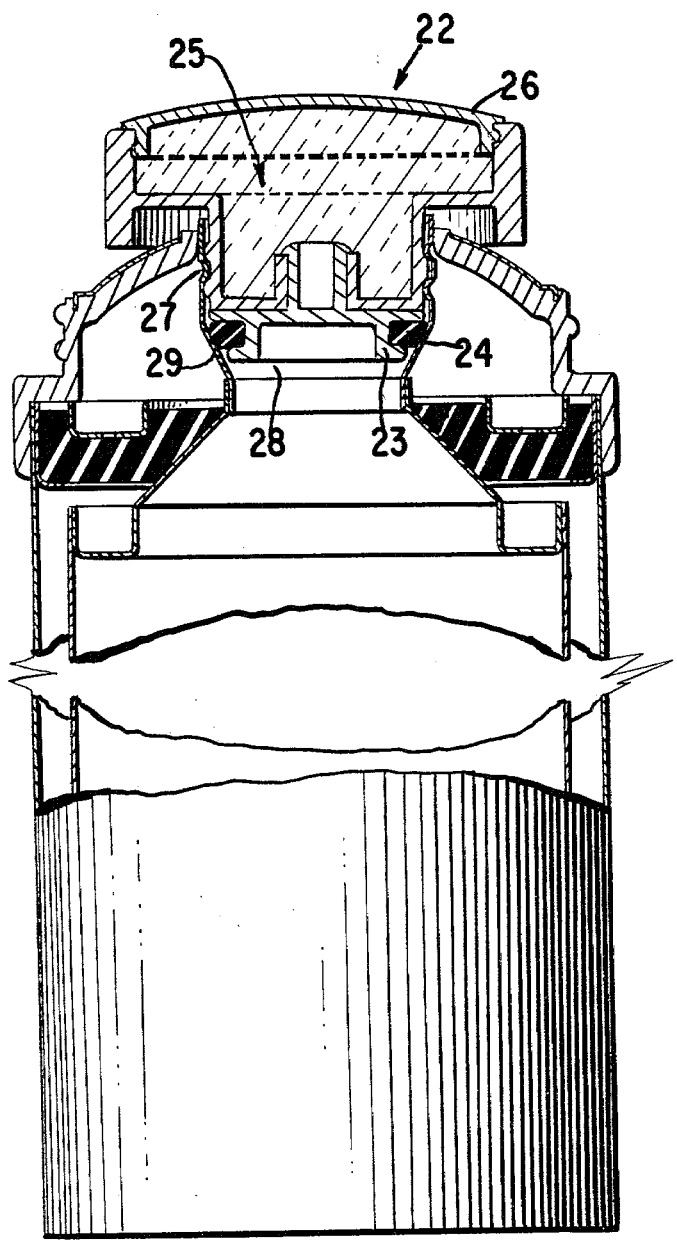
FIG. 7 represents a cross-sectional view of a further embodiment of the invention.

An additional stopper cap embodiment of this invention can be seen in FIG. 7. The structure of this stopper cap comprises a cap screw assembly 22, an O-ring retainer 23, an O-ring 24, insulation 25, which may comprise to some extent hollow space, and an outer shell or fitting 26 of the stopper cap.

The proposed stopper operates in the following manner:

The O-ring retainer 23, which is made of relatively inflexible polymeric material such as a polyethylene plastic, is thrust mounted on the lower portion of the screw cap assembly 22 so that it can turn freely and separately from the upper portion. The O-ring holder 23 holds O-ring 24 in its groove.

When the stopper cap assembly 22 is tightly secured in the thread 27 of bottle throat 28, the stopper cap assembly 22 travels downwardly until the O-ring 24 reaches narrow tapered portion 29 of throat 28. The outer surface of O-ring 24 seats in tapered portion 29 and stops turning while stopper cap assembly 22 is further turned or screwed in.

Thus, down-travelling stopper cap assembly 22 presses O-ring retainer 23 to squeeze O-ring 24, which spreads in all directions. Squeezed and spread O-ring 24 fills all possible spaces and gaps in the immediate vicinity, thus sealing the inside from outside.

Non-turning O-ring retainer 23 prevents the O-ring 24 from being torn out by squeezing and distortion. Insulating material 25 filled inside of stopper cap assembly 22 minimizes heat transfer between the inside and outside of the vacuum bottle.

The materials employed for the parts described above are the conventional materials known to those in the art. For example, the O-rings, the rubber seal 7, and the bottom supporting member 3 are preferably comprised of flexible rubber materials. For example, the O-rings and rubber seal 7 may be comprised of a silicone rubber, and member 16, O-ring retainer 23, the stopper caps, and protector 11 may be thermally non-conductive material such as polyethylene or a polyethylene derivative. The handle or grip and bottom spacer, or circular supporting member 3, may be comprised of ABS polymer.

In one embodiment of the invention, the outer shell may have a bottom protector attached thereto to aid in reducing conduction of heat and to protect surfaces. Such a bottom protector may be comprised of relatively rigid polymeric material such as ABS polymer.

In another embodiment, the cup 13 may be comprised of a metallic, preferably stainless steel, outer surface and an inner surface comprised of ABS polymer.

As can be seen by a comparison of, for example, FIGS. 1 and 7, the upper internal portion, i.e., throat, of the vacuum bottle may be varied to the configuration of the particular stopper cap assembly used.

I claim:

1. A stopper cap for a vacuum bottle capable of taking a threaded screw cap, comprising:
    a stopper cap body having threads thereon;
    an O-ring retainer movably connected to the bottom of said stopper cap body; and
    a rubber O-ring positioned on the lateral surface of the O-ring retainer
such that when the stopper cap is threaded into a reciprocally threaded vacuum bottle, the O-ring engages the inner throat portion of the bottle and thus spreads to seal the throat portion of the vacuum bottle as the stopper cap is further threaded in.

2. In combination with a vacuum bottle which includes a filler having a neck portion defining a smooth inwardly tapered throat opening having threading at its outermost portion, a closure assembly for said opening comprising:
    a stopper cap having threads thereon to engage the threads of the neck portion of the vacuum bottle;
    an O-ring retainer movably connected to the bottom of said stopper cap body; and
    a rubber O-ring positioned on the lateral surface of the O-ring retainer,
such that when the stopper cap is threaded into the vacuum bottle, the O-ring engages the tapered throat opening and thus spreads to seal the throat opening of the vacuum bottle as the stopper cap is threaded in.

* * * * *